Figures 1, 2, 3:
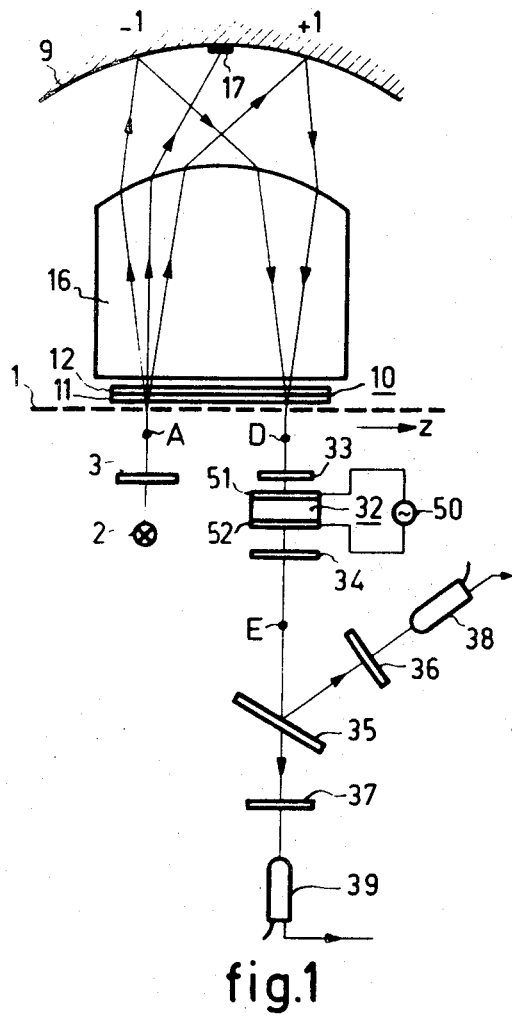

United States [11] 3,630,625

[72] Inventor Hendrik De Lang
     Delft, Netherlands
[21] Appl. No. 1,117
[22] Filed Jan. 7, 1970
[45] Patented Dec. 28, 1971
[73] Assignee U.S. Philips Corporation
     New York, N.Y.
[32] Priority Jan. 11, 1969
[33] Netherlands
[31] 6900491

[54] DEVICE FOR DETERMINING THE RELATIVE DISPLACEMENT OF AN OBJECT BY MEANS OF A DIFFRACTION GRATING MECHANICALLY SECURED TO THE OBJECT
2 Claims, 3 Drawing Figs.

[52] U.S. Cl.................................... 356/170,
     250/225, 350/157, 356/114
[51] Int. Cl....................................... G01b 11/26
[50] Field of Search........................... 250/225;
     356/114, 169, 170; 350/157

[56] References Cited
UNITED STATES PATENTS 3,482,107  12/1969  Hock............................ 356/169
2,441,049  5/1948   West............................ 350/157

OTHER REFERENCES

Adams & Waxler, Superimposed Birefractory Plates, Journal of Res. of Nat'l. Bureau of Standards, 1965 pp. 103–114.
"Light" by Ditchburn, 2nd ed., 1964 pp. 496–8.

*Primary Examiner*—Ronald L. Wibert
*Assistant Examiner*—J. Rothenberg
*Attorneys*—Frank R. Trifari and Simon L. Cohen

ABSTRACT: There is described a device for determining the relative displacement of an object by means of a diffraction grating which is mechanically secured to the object and the grooves of which extend at right angles to the direction of displacement, the radiation from the source of radiation once or several times traversing the grating and an associated optical system which includes an optically anisotropic element and ultimately falling on at least one photoelectric detector, in which signals are generated in the case of a displacement. It is stated that for this purpose the optically anisotropic element is included in the image-forming ray path of the diffraction grating and comprises the series arrangement of two birefringent uniaxial plate-shaped crystals the principal sections of which taken at right angles to the crystal surfaces are normal to one another, while in these principal sections the angle between the optic axis and the crystal surface is the same in both crystals. It is stated that the angle lies between 30° and 45°.

PATENTED DEC 28 1971
3,630,625

INVENTOR.
HENDRIK DE LANG
BY
AGENT

DEVICE FOR DETERMINING THE RELATIVE DISPLACEMENT OF AN OBJECT BY MEANS OF A DIFFRACTION GRATING MECHANICALLY SECURED TO THE OBJECT

The invention relates to a device for determining the relative displacement of an object by means of a diffraction grating which is mechanically secured to the object and the grooves of which are at right angles to the direction of displacement, the radiation from a source of radiation once or several times traversing the grating and an associated optical system which includes an optically anisotropic element and ultimately falling on at least one photoelectric detector, in which signals are generated in the case of displacement.

Such a device is known. The known device enables displacements to be accurately measured at a comparatively high speed of the grating.

A disadvantage of the known device is that the path length difference between ordinary and extraordinary waves propagating in the anisotropic element depends upon the wavelength of the radiation. When the anisotropic element is a so-called quarter-wave plate, the path length difference is a quarter of a wavelength for a defined wavelength. If another wavelength is to be used, the element in particular the quarter-wave plate, must be replaced by another element in order to retain the same path length difference. Thus, a thicker quarter-wave plate must be used when a longer wavelength is chosen.

It is an object of the present invention to render a device of the aforementioned kind achromatic so that a source of radiation having a broad emission spectrum can be used, in other works, the radiation source can be used with greater efficiency. For this purpose, the invention is characterized in that the optically anisotropic element is included in the image-forming ray path of the diffraction grating and comprises the series arrangement of two birefringent uniaxial plate-shaped crystals, the principal sections of which taken at right angles to the crystal surface are mutually perpendicular, while in these principal sections the angle between the optic axis and the crystal surface is the same in both crystals. Such an assembly of two such crystals is known under the name of "Savart plate."

The invention is based on the recognition that the path difference between the ordinary and extraordinary rays in the Savart plate in a suitable section is proportional to the angle of incidence of the radiation on the surface of the plate. (It should be noted that in a normal birefringent plate, such as a $\lambda/4$ plate, this linear effect does not occur). In a diffraction grating the angle between the direction of the beam of order 0 and the beam of order +1 or −1 in a first approximation is proportional to the wavelength of the radiation used. Hence, the path difference of the ordinary and extraordinary rays emerging from the assembly of a grating and a Savart plate, expressed in wavelengths remains constant when the wavelength is varied.

Especially if a path difference of $\lambda/4$ is desired in order to convert plane polarized radiation into circularly polarized radiation or conversely, with a suitable matching of the thickness of the Savart plate to the period of the grating this conversion is actually accomplished throughout a large wavelength range.

The invention will now be described, by way of example, with reference to the drawing, in which FIG. 1 shows an embodiment of a device according to the invention, and FIGS. 2 and 3 illustrate details of the device shown in FIG. 1.

In the device shown in FIG. 1, light from a source of light 2 having an angular frequency $\omega$ is converted by a polarizer 3 into plane polarized light the direction of polarization of which in this example is assumed to be parallel to the plane of the drawing. At A the beam can be represented by: $A_1 \sin \omega t$. A displaceable grating with period $p$ the lines of which are assumed to extend at right angles to the plane of the drawing is designated 1. The grating is rigidly secured to the object (not shown) the displacement $z$ of which is to be measured. The grating splits the beam into coherent sub-beams. The sub-beam of order −1 can be represented, for example at a location $B_{-1}$ (FIG. 2), by: $A_2 \sin(\omega t - 2\pi z/p)$ and that of order +1, for example at the location $B_{+1}$, by: $A_2 \sin(\omega t + 2\pi z/p)$. Through a planoconvex lens 16 the sub-beams fall on a concave mirror 9. Before the sub-beams of orders +1 and −1 fall on the planoconvex lens 16, they traverse an assembly 10 of two plates 11 and 12, which may be quartz plates. The plates 11 and 12 are oriented so that both the principal section taken at right angles to the surface of the plate 11 and the corresponding section of the plate 12 are at an angle of 45° To the plane of the drawing. These principal sections are at right angles to one another.

In the Savart plate 10 both the beam of order +1 and that of order −1 are split into an ordinary and an extraordinary sub-beam. The thickness of the assembly of the plates 11 and 12 can be chosen so that a path difference of $(2n+1)\lambda/8$ is produced between the ordinary and the extraordinary sub-beams. The sub-beams then fall on the concave mirror 9 through the planoconvex lens 16. Since the center of curvature of the convex surface of the lens 16 coincides with the center of curvature of the concave mirror 9, the rays reflected at the mirror after refraction at the convex surface of the lens 16 are parallel again to the rays traversing the lens 16 towards the mirror 9. The zero-order sub-beam is suppressed by coating the mirror with an absorbing layer 17.

After reflection at the mirror 9 the sub-beams again pass through the planoconvex lens 16 and then through the Savart plate 10. The sub-beams then have a path difference of $(2n+1)\lambda/4$. Each of the two plane polarized beam of radiation has been converted into a circularly polarized beam owning to this path difference. Because the principal directions of the component plates 11 and 12 are at right angles to one another, one beam, for example that of order −1, is a right-circularly polarized beam having the phase: $(\omega t - 2\pi z/p)$ and the other a left-circularly polarized beam having the phase: $(\omega t + 2\pi z/p)$. The coherent sub-beams again suffer diffraction at the grating 1. From the grating 1, directionally coincident coherent sub-beams of order (−1, −1) and of order (+1, +1) emerge. The directionally coincident sub-beams may be represented, for example at D, by a right-circularly polarized beam of phase $(\omega t - 4\pi z/p)$ and by a left-circularly polarized beam of phase $(\omega t + 4\pi z/p)$. The phase difference of the two beams is $\phi = 8\pi z/p$. The sum of the beams can be represented by a plane polarized oscillation the orientation $\alpha$ of the polarization plane of which is a linear function of the distance $z: \alpha = C_o + \frac{1}{2}\phi = C_o + 4\pi z/p$.

The plane-polarized oscillation falls on the series arrangement of a $\lambda/4$ plate 33, an electro-optical crystal 32, which may be made of potassium dihydrogen phosphate, and a $\lambda/4$ plate 34. THe principal directions of the $\lambda/4$ plates 33 and 34 are parallel to one another, and the principal direction of the crystal 32 is at an angle of 45° to those of the plates 33 and 34. To the crystal 32 there is applied an alternating voltage $V = V_o \sin \Omega t$ from an alternating voltage source 50 so that the field strength produced in the crystal by the voltage is parallel to the direction of propagation of the radiation in the crystal 32.

In a commonly assigned copending application of prior data U.S. Pat. application Ser. No. 780,750, filed Dec. 3, 1968, it has been proved that the orientation of the plane of polarization of the plane-polarized beam emerging from the series arrangement, disregarding the initial orientation, is represented by $\beta \sin \Omega t$. In this expression, $\beta$ is the amplitude of the angle of rotation of the plane of polarization.

The orientation of the plane of polarization of the plane-polarized beam emerging from the $\lambda/4$ plate 34 may therefore be represented, for example at E, by: $\alpha(z,t) = C_1 + 4\pi z/p + \beta \sin \Omega t$. An isotropic partially transparent mirror 35 splits the beam into two sub-beams. One beam falls through a polarizer 36 on a photocell 38, the other beam falls through a polarizer 37 on a photocell 39. The directions of polarization of the polarizers 36 and 37 are inclined at an angle of 45° to one another.

The output signals to the photocells, which signals are proportional to the intensities of the incident sub-beams, have the forms: $S_1 = C_2 + S \sin 2\alpha(z,t) = C_2 + S \sin(2C_1 + 8\pi z/p + 2\beta \sin \Omega t)$ and $S_2 = C_2 + S \cos 2\alpha(z,t) = C_2 + S \cos(2C_1 + 8\pi z/p + 2\beta \sin \Omega t)$, respectively. These signals may, for example, be processed in the manner described in copending U.S. Pat. application Ser. No. 780,750, filed Dec. 3, 1968, or in French Pat. specification No. 1,308,993. When the grating is displaced through a distance $\Delta z = p/16$, and additional passage through zero of either $S_1$ or $S_2$ occurs. Owing to the properties of the Savart plate 10, $\omega$ can be varied in a large range. In this range the path difference in the Savart plate between the ordinary and extraordinary rays remains $(2n+1)\lambda/8$.

FIG. 3 shows the path of the rays through the component plates 11 and 12 of the Savart plate 10 of a ray 20 normally incident on the surface ABCD of the plate 11. The direction of the optic axis of the plate 11, which is indicated by an arrow 15, is parallel to the lateral face ABEF which extends at right angles to the entrance face ABCD. The direction of polarization of the incident ray 20 is parallel to a plane ACGE. In the plate 11, the ray 20 is split into two rays, an ordinary ray 21 having a direction of polarization contained in a plane BCGF which passes unrefracted, and an extraordinary ray 22 having a direction of polarization in a plane AEFB which is refracted. The amplitudes of the two rays are equal because the directions of polarization of the refracted and unrefracted rays are inclined at angles of 45° to that of the incident ray 20.

The unrefracted ray 21 and the refracted ray 22 after passing through the plate 11 are parallel to one another, because the exit face EFGH of the plate 11 is parallel to the entrance face ABCD. The magnitude of the displacement of the extraordinary ray 22 relative to the ordinary ray 21 depends upon the thickness of the plate 11 and upon the angle between the optic axis and the surface of this plate.

The rays then fall on a face KLMN of the plate 12, which for the sake of clarity is shown spaced from the plate 11, but in actual fact is cemented to it. The direction of the optic axis of the plate 12, which is indicated by an arrow 16, is parallel to a lateral face LMRQ which is at right angles to the entrance face KLMN, which two faces are at right angles to the face ABFE of the plate 11. The ray 21, the direction of polarization of which is parallel to the principal section LMRQ of the plate 14, for this plate is an extraordinary ray and is refracted in a direction parallel to the principal section. The ray 22, the direction of polarization of which is at right angles to the principal section LMRQ, is an ordinary ray for the plate 12 and is transmitted without refraction.

If the thickness of the plate 11 is equal to that of the plate 12, the displacement of the refracted ray 23 emerging from the plate 12 relative to the ray 21 is equal to the displacement of the ray 22 relative to the ray 21. Since the direction of one displacement is at right angles to that of the other displacement, the plane containing the rays 23 and 24 which emerge from the Savart plate is inclined at an angle of 45° both to the principal section ABFE of the plate 11 and to the principal section LMRQ of the plate 12. The path difference of the ray 23 relative to the ray 24 is zero in the case of equal thickness of the component plates.

If the ray incident on the Savart plate 10 does not fall perpendicularly on the face ABCD so that the angle of incidence $i$ is different from 0°, the angle of 45° between the plane containing the emerging rays and the principal sections is retained. Consequently, this plane still is at right angles to the grooves of the grating 1.

It can be computed, cf. Francon "Optical Interferometry" page 140, that the path difference $\Delta$ between the rays which emerge from the Savart plate and are polarized in directions at right angles to one another is proportional to the angle $i$: $\Delta = ci$.

The rays of orders +1 and −1 which emerge from the grating 1 are inclined at an angle of $+i$ and $-i$ respectively to that surface of the Savart plate which is parallel to the grating. These angles $+i$ and $-i$ are proportional to the wavelength of the radiation incident on the grating 1: $i = c_1 \lambda$, so that $\Delta = ci = c_2 \lambda$. The path difference between the rays which emerge from the Savart plate and are polarized in directions at right angles to one another consequently is constant in terms of the wavelength.

In a practical embodiment, the Savart plate 10 consisted of two quartz crystals 11 and 12 each 0.9 mm. thick. The optic axis of each crystal was inclined at an angle of 45° to the crystal surface. The grating 1 had a spacing $p = 8\mu m$. The wavelength of the radiation varied between 0.6 $\mu m$ and 1.2 $\mu m$.

By rotating the grating 1 about an axis at right angles to its major surface, accurate matching of the real path difference between the ordinary and extraordinary rays in the Savart plate to the grating spacing is obtainable.

Obviously, the device according to the invention can also be used when the grating is in the form of a reflection grating. The device is suitable not only for measuring translations but also for measuring rotations.

What is claimed is:

1. A device for determining the relative displacement of an object, comprising a diffraction grating mechanically secured to the object and having grooves orientated at right angles to the direction of displacement of the object, means for directing a beam of radiation onto a first area of the grating whereby the beam is diffracted into angularly displaced sub-beams, means for redirecting the sub-beams back to a second area of the grating at a mutual angular displacement equal to the angular displacement of the sub-beams emanating from the grating, whereby the sub-beams are recombined into an output beam, photoelectric means in the path of the output beam for generating a signal corresponding to the displacement of the grating, and an anisotropic element in the path of the sub-beams emanating from and impinging on the grating and comprising at least two birefringent uniaxial plate-shaped crystals of equal thickness, the principal sections of which taken at right angles to the crystal surface are mutually perpendicular, the angle between the optic axis and the crystal surface in the principal sections of each of the crystals being equal, so that variations in the frequency of the radiation are compensated for.

2. A device as claimed in claim 1, wherein the angle between the optic axis and the crystal surface of each crystal lies between 30° and 45°.

* * * * *